US012772244B2

(12) United States Patent
Matsumura et al.

(10) Patent No.: US 12,772,244 B2
(45) **Date of Patent: *Oct. 20, 2026**

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 251 days.

This patent is subject to a terminal disclaimer.

(21) Appl. No.: 18/294,030

(22) PCT Filed: Aug. 4, 2021

(86) PCT No.: PCT/JP2021/029030

§ 371 (c)(1),
(2) Date: Jan. 31, 2024

(87) PCT Pub. No.: WO2023/012952

PCT Pub. Date: Feb. 9, 2023

(65) Prior Publication Data

US 2024/0334432 A1 Oct. 3, 2024

(51) Int. Cl.
*H04W 72/1273* (2023.01)
*H04W 72/23* (2023.01)

(52) U.S. Cl.
CPC ....... *H04W 72/1273* (2013.01); *H04W 72/23* (2023.01)

(58) Field of Classification Search
CPC ............. H04W 72/1273; H04W 72/23; H04W 72/232
USPC ........................................................... 370/329
See application file for complete search history.

(56) References Cited

U.S. PATENT DOCUMENTS

2020/0107353 A1* 4/2020 Jung ..................... H04W 72/23
2023/0026606 A1* 1/2023 Yuan ..................... H04W 72/23
2024/0422788 A1* 12/2024 Yi ......................... H04L 1/1812

OTHER PUBLICATIONS

International Search Report issued in PCT/JP2021/029030 on Mar. 22, 2022 (3 pages).

(Continued)

*Primary Examiner* — Rownak Islam
(74) *Attorney, Agent, or Firm* — Osha Bergman Watanabe & Burton LLP

(57) ABSTRACT

A terminal according to one aspect of the present disclosure includes a receiving section that receives, by using at least one of downlink control information (DCI) and a Medium Access Control Control Element (MAC CE), an indication indicating disabling or enabling of a transform precoder for a physical downlink shared channel (PUSCH), and a control section that switches, based on the indication, a waveform to be used for the PUSCH. According to one aspect of the present disclosure, it is possible to easily perform switching of a waveform.

4 Claims, 19 Drawing Sheets

(56) References Cited

OTHER PUBLICATIONS

Written Opinion of the International Searching Authority issued in PCT/JP2021/029030 on Mar. 22, 2022 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Qualcomm Incorporated; "Potential coverage enhancement techniques for PUSCH"; 3GPP TSG-RAN WG1 Meeting #103e, R1-2009729; e-Meeting; Oct. 26-Nov. 13, 2020 (15 pages).

* cited by examiner

```
PUSCH-PowerControl ::=                  SEQUENCE {
    tpc-Accumulation                        ENUMERATED { disabled }
OPTIONAL, -- Need S
    msg3-Alpha                              Alpha
OPTIONAL, -- Need S
    p0-NominalWithoutGrant                  INTEGER (-202..24)
OPTIONAL, -- Need M
    p0-AlphaSets                            SEQUENCE (SIZE (1..maxNrofP0-
PUSCH-AlphaSets)) OF P0-PUSCH-AlphaSet      OPTIONAL, -- Need M
    pathlossReferenceRSToAddModList         SEQUENCE (SIZE (1..maxNrofPUSCH-
PathlossReferenceRSs)) OF PUSCH-PathlossReferenceRS

OPTIONAL, -- Need N
    pathlossReferenceRSToReleaseList        SEQUENCE (SIZE (1..maxNrofPUSCH-
PathlossReferenceRSs)) OF PUSCH-PathlossReferenceRS-Id

OPTIONAL,  -- Need N
    twoPUSCH-PC-AdjustmentStates            ENUMERATED {twoStates}
OPTIONAL, -- Need S
    deltaMCS                                ENUMERATED {enabled}
OPTIONAL, -- Need S
    sri-PUSCH-MappingToAddModList           SEQUENCE (SIZE (1..maxNrofSRI-
PUSCH-Mappings)) OF SRI-PUSCH-PowerControl

OPTIONAL, -- Need N
    sri-PUSCH-MappingToReleaseList          SEQUENCE (SIZE (1..maxNrofSRI-
PUSCH-Mappings)) OF SRI-PUSCH-PowerControlId

OPTIONAL  -- Need N
}

...

SRI-PUSCH-PowerControl ::=              SEQUENCE {
    sri-PUSCH-PowerControlId                SRI-PUSCH-PowerControlId,
    sri-PUSCH-PathlossReferenceRS-Id        PUSCH-PathlossReferenceRS-Id,
    sri-P0-PUSCH-AlphaSetId                 P0-PUSCH-AlphaSetId,
    sri-PUSCH-ClosedLoopIndex               ENUMERATED { i0, i1 }
}
...
```

FIG. 3

| MCS Index $I_{MCS}$ | Modulation Order $Q_m$ | Target code Rate R x 1024 | Spectral efficiency |
|---|---|---|---|
| 0 | q | 240/ q | 0.2344 |
| 1 | q | 314/ q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | reserved | |
| 29 | 2 | reserved | |
| 30 | 4 | reserved | |
| 31 | 6 | reserved | |

FIG. 4

| MCS Index $I_{MCS}$ | Modulation Order $Q_m$ | Target code Rate R x 1024 | Spectral efficiency |
|---|---|---|---|
| 0 | $q$ | $60/q$ | 0.0586 |
| 1 | $q$ | $80/q$ | 0.0781 |
| 2 | $q$ | $100/q$ | 0.0977 |
| 3 | $q$ | $128/q$ | 0.1250 |
| 4 | $q$ | $156/q$ | 0.1523 |
| 5 | $q$ | $198/q$ | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | q | reserved | |
| 29 | 2 | reserved | |
| 30 | 4 | reserved | |
| 31 | 6 | reserved | |

FIG. 5

| Bit field mapped to index | *codebookSubset = fullyAndPartialAndNonCoherent* | Bit field mapped to index | *codebookSubset = partialAndNonCoherent* | Bit field mapped to index | *codebookSubset= nonCoherent* |
|---|---|---|---|---|---|
| 0 | 1 layer: TPMI=0 | 0 | 1 layer: TPMI=0 | 0 | 1 layer: TPMI=0 |
| 1 | 1 layer: TPMI=1 | 1 | 1 layer: TPMI=1 | 1 | 1 layer: TPMI=1 |
| ... | ... | ... | ... | ... | ... |
| 3 | 1 layer: TPMI=3 | 3 | 1 layer: TPMI=3 | 3 | 1 layer: TPMI=3 |
| 4 | 2 layers: TPMI=0 | 4 | 2 layers: TPMI=0 | 4 | 2 layers: TPMI=0 |
| ... | ... | ... | ... | ... | ... |
| 9 | 2 layers: TPMI=5 | 9 | 2 layers: TPMI=5 | 9 | 2 layers: TPMI=5 |
| 10 | 3 layers: TPMI=0 | 10 | 3 layers: TPMI=0 | 10 | 3 layers: TPMI=0 |
| 11 | 4 layers: TPMI=0 | 11 | 4 layers: TPMI=0 | 11 | 4 layers: TPMI=0 |
| 12 | 1 layer: TPMI=4 | 12 | 1 layer: TPMI=4 | 12-15 | reserved |
| ... | ... | ... | ... | | |
| 19 | 1 layer: TPMI=11 | 19 | 1 layer: TPMI=11 | | |
| 20 | 2 layers: TPMI=6 | 20 | 2 layers: TPMI=6 | | |
| ... | ... | ... | ... | | |
| 27 | 2 layers: TPMI=13 | 27 | 2 layers: TPMI=13 | | |
| 28 | 3 layers: TPMI=1 | 28 | 3 layers: TPMI=1 | | |
| 29 | 3 layers: TPMI=2 | 29 | 3 layers: TPMI=2 | | |
| 30 | 4 layers: TPMI=1 | 30 | 4 layers: TPMI=1 | | |
| 31 | 4 layers: TPMI=2 | 31 | 4 layers: TPMI=2 | | |
| 32 | 1 layers: TPMI=12 | | | | |
| ... | ... | | | | |
| 47 | 1 layers: TPMI=27 | | | | |
| 48 | 2 layers: TPMI=14 | | | | |
| ... | ... | | | | |
| 55 | 2 layers: TPMI=21 | | | | |
| 56 | 3 layers: TPMI=3 | | | | |
| ... | ... | | | | |
| 59 | 3 layers: TPMI=6 | | | | |
| 60 | 4 layers: TPMI=3 | | | | |
| 61 | 4 layers: TPMI=4 | | | | |
| 62-63 | reserved | | | | |

FIG. 6

| Bit field mapped to index | *codebookSubset = fullyAndPartialAndNonCoherent* | Bit field mapped to index | *codebookSubset= partialAndNonCoherent* | Bit field mapped to index | *codebookSubset= nonCoherent* |
|---|---|---|---|---|---|
| 0 | 1 layer: TPMI=0 | 0 | 1 layer: TPMI=0 | 0 | 1 layer: TPMI=0 |
| 1 | 1 layer: TPMI=1 | 1 | 1 layer: TPMI=1 | 1 | 1 layer: TPMI=1 |
| ... | ... | ... | ... | ... | ... |
| 3 | 1 layer: TPMI=3 | 3 | 1 layer: TPMI=3 | 3 | 1 layer: TPMI=3 |
| 4 | 1 layer: TPMI=4 | 4 | 1 layer: TPMI=4 | | |
| ... | ... | ... | ... | | |
| 11 | 1 layer: TPMI=11 | 11 | 1 layer: TPMI=11 | | |
| 12 | 1 layers: TPMI=12 | 12-15 | reserved | | |
| ... | ... | | | | |
| 27 | 1 layers: TPMI=27 | | | | |
| 28-31 | reserved | | | | |

FIG. 7

NEW FIELD

| Bit field mapped to index | *codebookSubset = fullyAndPartialAndNonCoherent* | | Bit field mapped to index | *codebookSubset = partialAndNonCoherent* | | Bit field mapped to index | *codebookSubset= nonCoherent* | |
|---|---|---|---|---|---|---|---|---|
| 0 | 1 layer: TPMI=0 | | 0 | 1 layer: TPMI=0 | | 0 | 1 layer: TPMI=0 | |
| 1 | 1 layer: TPMI=1 | | 1 | 1 layer: TPMI=1 | | 1 | 1 layer: TPMI=1 | |
| ... | ... | | ... | ... | | ... | ... | |
| 3 | 1 layer: TPMI=3 | | 3 | 1 layer: TPMI=3 | | 3 | 1 layer: TPMI=3 | |
| 4 | 2 layers: TPMI=0 | | 4 | 2 layers: TPMI=0 | | 4 | 2 layers: TPMI=0 | |
| ... | ... | | ... | ... | | ... | ... | |
| 9 | 2 layers: TPMI=5 | | 9 | 2 layers: TPMI=5 | | 9 | 2 layers: TPMI=5 | |
| 10 | 3 layers: TPMI=0 | | 10 | 3 layers: TPMI=0 | | 10 | 3 layers: TPMI=0 | |
| 11 | 4 layers: TPMI=0 | | 11 | 4 layers: TPMI=0 | | 11 | 4 layers: TPMI=0 | |
| 12 | 1 layer: TPMI=4 | | 12 | 1 layer: TPMI=4 | | 12-15 | reserved | |
| ... | ... | | ... | ... | | | | |
| 19 | 1 layer: TPMI=11 | | 19 | 1 layer: TPMI=11 | | | | |
| 20 | 2 layers: TPMI=6 | | 20 | 2 layers: TPMI=6 | | | | |
| ... | ... | | ... | ... | | | | |
| 27 | 2 layers: TPMI=13 | | 27 | 2 layers: TPMI=13 | | | | |
| 28 | 3 layers: TPMI=1 | | 28 | 3 layers: TPMI=1 | | | | |
| 29 | 3 layers: TPMI=2 | | 29 | 3 layers: TPMI=2 | | | | |
| 30 | 4 layers: TPMI=1 | | 30 | 4 layers: TPMI=1 | | | | |
| 31 | 4 layers: TPMI=2 | | 31 | 4 layers: TPMI=2 | | | | |
| 32 | 1 layers: TPMI=12 | | | | | | | |
| ... | ... | | | | | | | |
| 47 | 1 layers: TPMI=27 | | | | | | | |
| 48 | 2 layers: TPMI=14 | | | | | | | |
| ... | ... | | | | | | | |
| 55 | 2 layers: TPMI=21 | | | | | | | |
| 56 | 3 layers: TPMI=3 | | | | | | | |
| ... | ... | | | | | | | |
| 59 | 3 layers: TPMI=6 | | | | | | | |
| 60 | 4 layers: TPMI=3 | | | | | | | |
| 61 | 4 layers: TPMI=4 | | | | | | | |
| 62-63 | reserved | | | | | | | |

FIG. 8

| Value | Number of DMRS CDM group(s) without data | DMRS port(s) |
|---|---|---|
| 0 | 1 | 0 |
| 1 | 1 | 1 |
| 2 | 2 | 0 |
| 3 | 2 | 1 |
| 4 | 2 | 2 |
| 5 | 2 | 3 |
| 6-7 | Reserved | Reserved |

FIG. 9

| Value | Number of DMRS CDM group(s) without data | DMRS port(s) |
|---|---|---|
| 0 | 2 | 0 |
| 1 | 2 | 1 |
| 2 | 2 | 2 |
| 3 | 2 | 3 |

FIG. 10

| SCS | MINIMUM K2 VALUE |
|---|---|
| 15 | K2_1 |
| 30 | K2_2 |
| 60 | K2_3 |
| 120 | K2_4 |

| SCS | ADDITIONAL VALUE |
| --- | --- |
| 15 | 1-symbol |
| 30 | 1-symbol |
| 60 | 2-symbol |
| 120 | 4-symbol |

| Index | Starting symbol | ... | Additional value |
|---|---|---|---|
| 0 | | | A_0 |
| 1 | | | A_1 |
| 2 | | | A_2 |
| ... | | | ... |
| 15 | | | A_15 |

FIG. 15

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as “5th generation mobile communication system (5G),” “5G+ (plus),” “6th generation mobile communication system (6G),” “New Radio (NR),” “3GPP Rel. 15 (or later versions),” and so on) are also under study.

CITATION LIST

Non-Patent Literature

Non-Patent Literature 1: 3GPP TS 36.300 V8.12.0 “Evolved Universal Terrestrial Radio Access (E-UTRA) and Evolved Universal Terrestrial Radio Access Network (E-UTRAN); Overall description; Stage 2 (Release 8),” April, 2010

SUMMARY OF INVENTION

Technical Problem

For radio communication systems (for example, NR), it is studied that a cyclic prefix-OFDM (Cyclic Prefix-Orthogonal Frequency Division Multiplexing (CP-OFDM)) waveform being a multi-carrier waveform is supported, in addition to a discrete Fourier transform-spread-OFDM waveform (Discrete Fourier Transform-Spread-Orthogonal Frequency Division Multiplexing (DFT-s-OFDM)) being a single-carrier waveform.

However, conventional waveform configuration is performed by Radio Resource Control (RRC), and thus RRC reconfiguration is necessary for switching a waveform. Therefore, signaling overhead increases, and communication throughput may decrease.

Thus, an object of the present disclosure is to provide a terminal, a radio communication method, and a base station that can easily perform switching of a waveform.

Solution to Problem

A terminal according to one aspect of the present disclosure includes a receiving section that receives, by using at least one of downlink control information (DCI) and a Medium Access Control Control Element (MAC CE), an indication indicating disabling or enabling of a transform precoder for a physical downlink shared channel (PUSCH), and a control section that switches, based on the indication, a waveform to be used for the PUSCH.

Advantageous Effects of Invention

According to one aspect of the present disclosure, it is possible to easily perform switching of a waveform.

BRIEF DESCRIPTION OF DRAWINGS

FIG. 3 is a diagram to show a PUSCH power control information element in 3GPP Rel. 16.

FIG. 4 is a diagram to show a first example of an MCS table in 3GPP Rel. 16.

FIG. 5 is a diagram to show a second example of the MCS table in 3GPP Rel. 16.

FIG. 6 is a diagram to show a precoding information and number of layers table in 3GPP Rel. 16 in a case where a transform precoder is disabled.

FIG. 7 is a diagram to show a precoding information and number of layers table in 3GPP Rel. 16 in a case where a transform precoder is enabled.

FIG. 8 is a diagram to show a precoding information and number of layers table in a case where dynamic waveform switching is configured.

FIG. 9 shows a table corresponding to an antenna port field in a case where a transform precoder is disabled in Rel. 16.

FIG. 10 shows a table corresponding to an antenna port field in a case where a transform precoder is enabled in 3GPP Rel. 16.

FIG. 15 is a diagram to show an example of TimeDomainAllocationList including an additional value.

Figure 1:
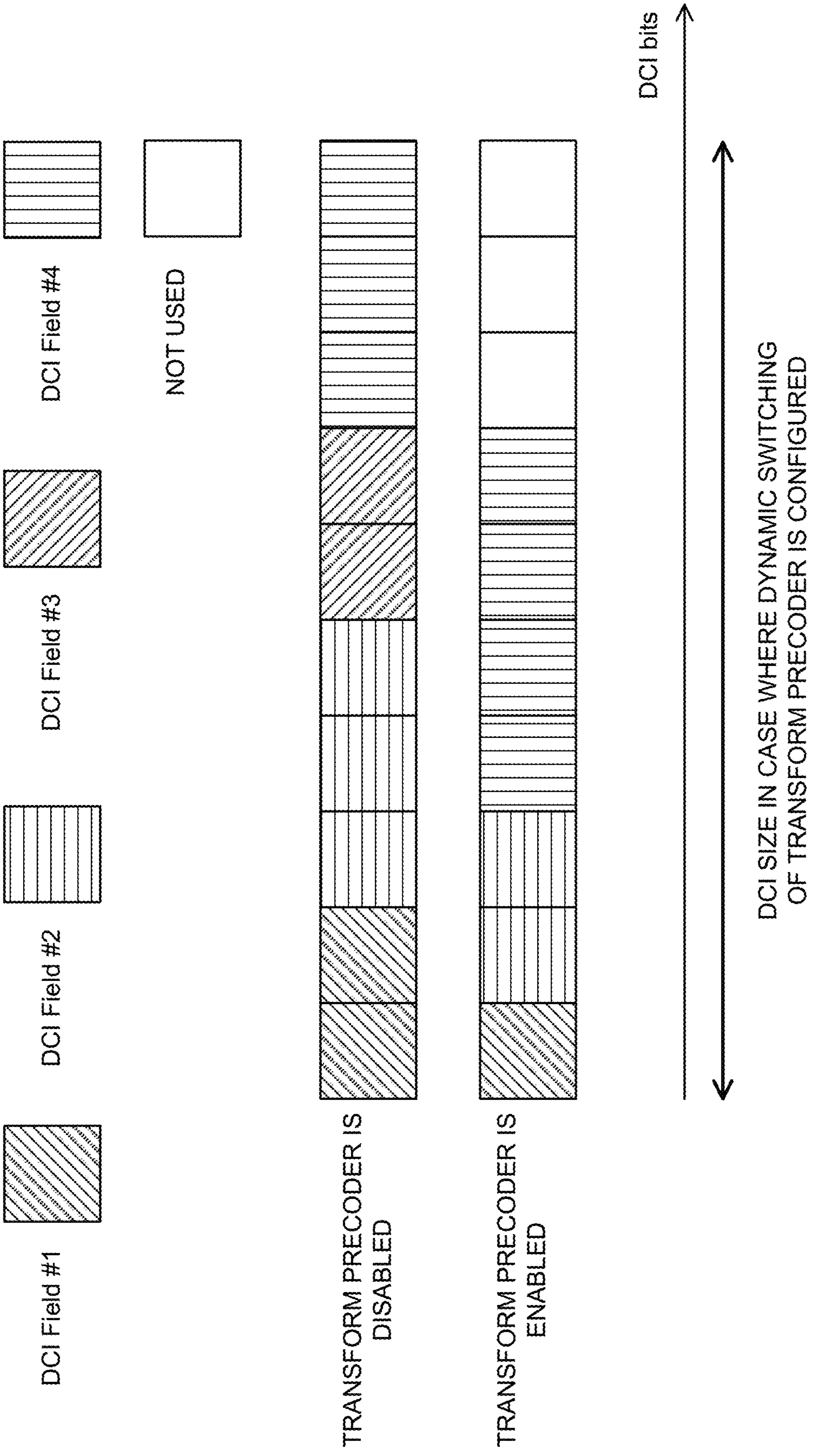
FIG. 1 is a diagram to show a DCI size in option 1-1.

DESCRIPTION OF EMBODIMENTS (PUSCH Transmission Power Control)

In NR, transmission power for a PUSCH is controlled, based on a TPC command (also referred to as a value, an increasing/decreasing value, a correction value, or the like)

indicated by a value of a certain field (also referred to as a TPC command field or the like) in DCI.

For example, when a UE transmits the PUSCH on active UL BWP b on carrier f of serving cell c by using a parameter set having index j (open-loop parameter set) and index l of a power control adjustment state, transmission power for the PUSCH ($P_{PUSCH,b,f,c}$ (i, j, $q_d$, l)) in PUSCH transmission occasion (also referred to as a transmission period or the like) i may be represented by Equation (1) described below.

Here, for the power control adjustment state, whether the power control adjustment state has a plurality of states (for example, 2 states) or a single state may be configured by a higher layer parameter. When a plurality of power control adjustment states are configured, one of the plurality of power control adjustment states may be identified by index l (for example, l ∈{0, 1}). The power control adjustment state may be referred to as a PUSCH power control adjustment state, a first or second state, or the like.

PUSCH transmission occasion i is a certain period in which the PUSCH is transmitted, and may be constituted by, for example, one or more symbols, one or more slots, or the like.

is determined by the open-loop control and the closed-loop control by using UE maximum transmittable power as an upper limit of the transmission power.

(CP-OFDM and DFT-s-OFDM)

Uplink (UL) in radio communication systems (for example, NR) supports a Discrete Fourier Transform-Spread-Orthogonal Frequency Division Multiplexing (DFT-s-OFDM) waveform being a single-carrier waveform, in addition to a Cyclic Prefix-Orthogonal Frequency Division Multiplexing (CP-OFDM) waveform being a multi-carrier waveform. A "waveform" in the present disclosure indicates at least one of the CP-OFDM waveform (CP-OFDM-based waveform) and the DFT-S-OFDM waveform (DFT-s-OFDM-based waveform).

CP-OFDM allows frequency resource assignment to be performed more flexibly. For example, both consecutive Physical Resource Block (PRB) assignment and non-consecutive PRB assignment are allowed. The consecutive PRB assignment is not limited to multiples of 2, 3, and 5. When CP-OFDM is applied, frequency division multiplexing (FDM) may be used for a DeModulation Reference Signal (DMRS) and a PUSCH.

[Math. 1]

$$P_{PUSCH,b,f,c}(i,j,q_d,l) = \min\left\{\begin{array}{l} P_{CMAX,f,c}(i), \\ P_{O\_PUSCH,b,f,c}(j) + 10\log_{10}\left(2^{\mu}\cdot M^{PUSCH}_{RB,b,f,c}(i)\right) + \alpha_{b,f,c}(j)\cdot PL_{b,f,c}(q_d) + \Delta_{TF,b,f,c}(i) + f_{b,f,c}(i,l) \end{array}\right\} \quad \text{(Equation 1)}$$

In Equation (1), $P_{CMAX,f,c}$ (i) is, for example, transmission power (also referred to as maximum transmission power, UE maximum output power, or the like) of a user terminal configured for carrier f of serving cell c in transmission occasion i. $P_{O\_PUSCH,b,f,c}$ (j) is, for example, a parameter related to target received power configured for active UL BWP b on carrier f of serving cell c in transmission occasion i (also referred to as, for example, a parameter related to transmission power offset, transmission power offset P0, a target received power parameter, or the like).

$M^{PUSCH}_{RB,b,f,c}$ (i) is, for example, the number of resource blocks (bandwidths) allocated to the PUSCH for transmission occasion i in active UL BWP b on carrier f in serving cell c and with subcarrier spacing μ. $\alpha_{b,f,c}$ (j) is a value provided by a higher layer parameter (also referred to as, for example, msg3-Alpha, p0-PUSCH-Alpha, a fractional factor, or the like).

$PL_{b,f,c}$ ($q_d$) is, for example, a pathloss (pathloss compensation) calculated in the user terminal by using index $q_d$ of a reference signal (pathloss reference RS, pathloss measurement DL RS, PUSCH-PathlossReferenceRS) for a downlink BWP associated with active UL BWP b on carrier f of serving cell c.

$\Delta_{TF,b,f,c}$ (i) is a transmission power adjustment component (offset, transmission format compensation) for UL BWP b on carrier f of serving cell c.

$f_{b,f,c}$ (i, l) is a value based on a TPC command with the above-described power control adjustment state index l for the active UL BWP on carrier f in serving cell c and transmission occasion i (for example, a power control adjustment state, an accumulated value of the TPC command, or a closed-loop value).

In Equation (1), parameters related to open-loop control are $M^{PUSCH}_{RB,b,f,c}$ (i), $P_{O\_PUSCH,b,f,c}$ (j), $\alpha_{b,f,c}$ (j), and $PL_{b,f,c}$ ($q_d$). Also, a parameter related to closed-loop control is $f_{b,f,c}$ (i, l). In other words, the transmission power for the PUSCH DFT-s-OFDM has severe constraints on frequency resource assignment, but has a low peak-to-average power ratio (PAPR), and is suitable for the UE with limited power.

Note that for communication throughput without consideration of the PAPR, CP-OFDM has communication throughput higher than that of DFT-s-OFDM. For communication throughput with consideration of the PAPR, communication throughput of CP-OFDM is higher than that of DFT-s-OFDM when an SNR (MCS) is high (modulation and coding scheme is 16 QAM or 64 QAM), but DFT-s-OFDM has communication throughput higher than that of CP-OFDM when the SNR (MCS) is low (modulation and coding scheme is QPSK). In other words, a preferable waveform varies depending on an SNR (MCS).

In a normal case, a network (NW) switches a waveform, based on a Signal to Noise Ratio (SNR). Switching between DFT-s-OFDM and CP-OFDM is performed by a transform precoder "transformPrecoder" of an uplink shared channel (Physical Uplink Shared Channel (PUSCH) configuration (PUSCH-Config) with Radio Resource Control (RRC) signaling. CP-OFDM is applied when the transform precoder is disabled, and DFT-s-OFDM is applied when the transform precoder is enabled. The waveform switching requires RRC reconfiguration. Therefore, signaling overhead increases, and communication throughput may decrease.

For more flexible throughput control, it is conceivable that dynamic switching between CP-OFDM and DFT-s-OFDM is performed by DCI/MAC CE. However, studies of such dynamic switching have not yet advanced.

For example, in an existing specification (for example, 3GPP Rel. 16), as described in (1) to (6) below, sizes of some DCI fields in a DCI format (for example, DCI format 0_0/0_1/0_2) are affected by the waveform switching.

(1) In a "Precoding information and number of layers" field, different tables are used for two waveforms.

(2) In an "Antenna ports" field, different tables are used for two waveforms.

(3) In a "DMRS sequence initialization" field, the field becomes 0 bit when the transform precoder is enabled, and the field becomes 1 bit when the transform precoder is disabled.

(4) In a "PTRS-DMRS association" field, a DCI size is affected by the transform precoder.

(5) In "Frequency domain resource assignment," a DCI size varies depending on a resource assignment type. Resource assignment to be supported varies depending on a waveform. CP-OFDM supports resource assignment types 0, 1, and 2, and DFT-s-OFDM supports resource assignment types 1 and 2.

(6) In a "Frequency hopping flag" field, a DCI size varies depending on a resource assignment type. As described above, resource assignment to be supported varies depending on a waveform.

Conventional waveform configuration is performed by RRC, and thus a UE can determine a DCI format size, depending on waveform switching (based on RRC configuration). On the other hand, variation in a DCI format size in a case of dynamic waveform switching makes it difficult to control monitoring, and thus it is preferable that the size is a constant size regardless of a waveform. However, studies have not yet advanced how to configure the DCI, how the UE judges a size of the DCI, and the like.

Thus, the inventors of the present invention came up with the idea of a terminal that suitably performs dynamic switching between disabling and enabling of a transform precoder for a PUSCH (waveform switching) by using DCI/MAC CE.

Embodiments according to the present disclosure will be described in detail with reference to the drawings as follows. The radio communication methods according to respective embodiments may each be employed individually, or may be employed in combination.

In the present disclosure, "A/B/C" and "at least one of A, B, and C" may be interchangeably interpreted. In the present disclosure, a cell, a CC, a carrier, a BWP, a DL BWP, a UL BWP, an active DL BWP, an active UL BWP, and a band may be interchangeably interpreted. In the present disclosure, an index, an ID, an indicator, a resource ID, and an RI (resource indicator or rank indicator) may be interchangeably interpreted. In the present disclosure, "support," "control," "controllable," "operate," and "operable" may be interchangeably interpreted.

In the present disclosure, configuration (configure), activation (activate), update, indication (indicate), enabling (enable), specification (specify), and selection (select) may be interchangeably interpreted.

In the present disclosure, a MAC CE and an activation/deactivation command may be interchangeably interpreted.

In the present disclosure, the higher layer signaling may be, for example, any one or combinations of Radio Resource Control (RRC) signaling, Medium Access Control (MAC) signaling, broadcast information (master information block (MIB), system information block (SIB), or the like), and the like. In the present disclosure, RRC, RRC signaling, an RRC parameter, a higher layer, a higher layer parameter, an RRC information element (IE), and an RRC message may be interchangeably interpreted. Reporting in the present disclosure may be performed by the higher layer signaling. "Reporting," "measurement," and "transmission" in the present disclosure may be interchangeably interpreted.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

Note that in the present disclosure, "A/B" may be interpreted as "at least one of A and B." Application/use of CP-OFDM and a disabled (disabling of) transform precoder (transformPrecoder) may be interchangeably interpreted. Application/use of DFT-s-OFDM and an enabled (enabling of) transform precoder may be interchangeably interpreted. Disabling/enabling of a transform precoder, switching of a transform precoder, and switching of a waveform (CP-OFDM/DFT-s-OFDM) may be interchangeably interpreted. A waveform and a transform precoder may be interchangeably interpreted. CP-OFDM and a CP-OFDM waveform may be interchangeably interpreted. DFT-s-OFDM and a DFT-s-OFDM waveform may be interchangeably interpreted.

(Radio Communication Method)

A UE may receive a configuration indicating dynamic switching between disabling and enabling of a transform precoder for a PUSCH, the dynamic switching using DCI/MAC CE. The UE may receive, by using the DCI/MAC CE, an indication indicating enabling or disabling of the transform precoder for the PUSCH. Hereinafter, the dynamic switching using DCI/MAC CE is sometimes simply described as dynamic switching. Note that the UE may be preconfigured with dynamic switching of a waveform/transform precoder (availability of the switching) by higher layer signaling or the like. Regardless of the presence or absence of the configuration, dynamic switching of the transform precoder using the DCI/MAC CE may be available.

For example, DCI signaling-based dynamic waveform switching may be performed implicitly or explicitly. For example, the DCI may include a 1-bit field indicating a CP-OFDM or DFT-s-OFDM waveform used for the PUSCH (explicit signaling). For example, the UE may determine/identify the CP-OFDM or DFT-s-OFDM waveform used for the PUSCH, depending on a specific condition out of scheduling information and the like in the DCI (implicit signaling). In this case, an existing DCI format is not changed.

Alternatively, MAC CE signaling-based dynamic UL waveform switching may be performed. For example, the MAC CE may include a 1-bit field indicating a CP-OFDM or DFT-s-OFDM waveform used for the PUSCH (explicit signaling). Alternatively, the UE may determine/identify the CP-OFDM or DFT-s-OFDM waveform used for the PUSCH, based on an existing field in the MAC CE (implicit signaling).

For example, a DCI format in the present disclosure may indicate DCI format 0_0/DCI format 0_1/DCI format 0_2, or may be another format (for example, DCI format 0_3 for notifying waveform switching). For example, as such another format, such group-common DCI as DCI format 2_x may be used. In this case, waveform switching may be applied after a certain time period from ACK transmission by the UE in response to reception of DCI format 2_x.

Switching between disabling and enabling of a transform precoder (waveform switching) in the present disclosure may be waveform switching in the same BWP (switching of a waveform without switching of a BWP). For example, a different transform precoder is configurable for each BWP, and thus it is also conceivable that a transform precoder is switched by BWP switching, but a delay occurs due to the BWP switching. Therefore, switching between disabling and enabling of the transform precoder is performed in the same BWP, thereby allowing the delay to be suppressed.

First Embodiment

When dynamic switching, by DCI/MAC CE, between disabling and enabling of a transform precoder for a PUSCH is configured, a UE may receive, by using the DCI/MAC CE, an indication indicating enabling or disabling of the transform precoder for the PUSCH, and may switch, based on the indication, a waveform (CP-OFDM/DFT-s-OFDM) to be used for the PUSCH.

A total DCI size of a DCI format may be constant regardless of disabling and enabling of the transform precoder. The size of the DCI format may be configured/determined by higher layer signaling (RRC). In other words, the size of the DCI format may not depend on the DCI/MAC CE.

Note, however, that in some DCI fields, a size of each DCI field may vary depending on disabling and enabling of the transform precoder. The some DCI fields are, for example, "Precoding information and number of layers," "Antenna ports," "DMRS sequence initialization," "PTRS-DMRS association," "Frequency resource assignment," and "Frequency hopping flag." For example, as described in (1) to (6) according to the existing specification mentioned above, the DCI size may vary.

[Option 1-1]

When dynamic switching of the transform precoder for the PUSCH (switching using the DCI/MAC CE) is configured for the PUSCH, for each DCI format, a total DCI format size may be a larger one of a size of a DCI format in a case where the transform precoder is disabled and a size of a DCI format in a case where the transform precoder is enabled.

When the transform precoder is disabled/enabled by the MAC CE, the UE may read each DCI field from the least significant bit (LSB), depending on a size of each DCI field. Alternatively, the UE may read each DCI field from the most significant bit (MSB).

FIG. 1 is a diagram to show the DCI size in option 1-1. According to FIG. 1, the number of DCI bits (sum of DCIFields #1 to #4) in a case where the transform precoder is disabled is 10 bits, and the number of DCI bits in a case where the transform precoder is enabled is 7 bits. In this case, 10 bits being the larger DCI size are used as a total DCI size in a case where dynamic switching of the transform precoder is configured.

In FIG. 1, the smaller DCI bits (DCI bits in a case where the transform precoder is enabled) are mapped from the far left side (least significant bit), but may be mapped from the far right side (most significant bit). In other words, the UE may read each DCI field from the least significant bit, or may read each DCI field from the most significant bit.

In option 1-1, the total DCI size can be reduced as compared to option 1-2 mentioned below.

[Option 1-2]

When dynamic switching of the transform precoder for the PUSCH is configured for the PUSCH, for each DCI format, a larger size of a DCI field size in a case where the transform precoder is disabled and a DCI field size in a case where the transform precoder is enabled may be determined for each field, and a total DCI format size may be a sum value of the larger sizes in all DCI fields.

In other words, when the number of fields of a certain DCI format is assumed to be N, a total size of the DCI format is calculated as follows.

Total DCI format size=Σ(MAX (size of DCI field i with disabled transform precoder, size of DCI field i with enabled transform precoder)) (i=1 to N)

When the transform precoder is disabled/enabled by the MAC CE, the UE may read each DCI field from the least significant bit (LSB), depending on a size of each DCI field. Alternatively, the UE may read each DCI field from the most significant bit (MSB).

Figure 2:
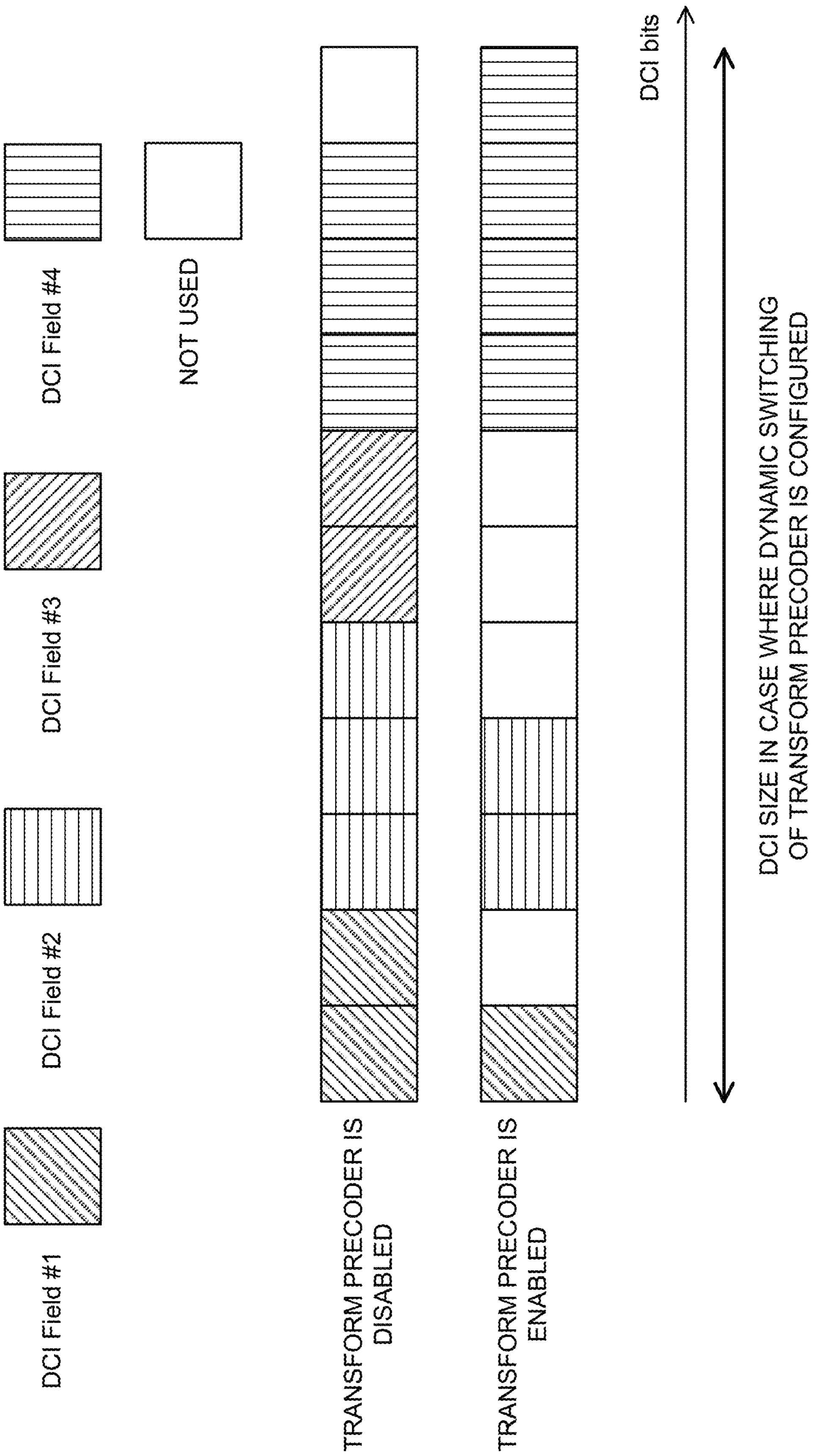
FIG. 2 is a diagram to show a DCI size in option 1-2.

FIG. 2 is a diagram to show the DCI size in option 1-2. According to FIG. 2, in DCI Field #1, a larger size of a DCI field size (2 bits) in a case where the transform precoder is disabled and a DCI field size (1 bit) in a case where the transform precoder is enabled is 2 bits. Similarly, the larger sizes in DCI Field #2, DCI Field #3, and DCI Field #4 are 3 bits, 2 bits, and 4 bits, respectively. By adding up these sizes (2+3+2+4=11), 11 bits are used as a total DCI size in a case where dynamic switching of the transform precoder is configured.

In FIG. 2, in each field, smaller DCI bits are mapped from the far left side (least significant bit), but may be mapped from the far right side (most significant bit). In other words, the UE may read each DCI field from the least significant bit, or may read each DCI field from the most significant bit.

In an example in FIG. 2, in a case where the transform precoder is disabled and a case where the transform precoder is enabled, bits at a start location of each field (bit ranges used for each field) are the same. For example, start locations of DCI Field #1, DCI Field #2, DCI Field #3, and DCI Field #4 are the first bit, the third bit, the sixth bit, and the eighth bit, respectively. Thus, a process for detecting each field performed by the UE can be facilitated.

According to a first embodiment, even when switching between enabling/disabling of a transform precoder is performed, DCI sizes to be detected are the same, and thus an increase in UE processing load can be suppressed.

Second Embodiment

When dynamic switching of a transform precoder for a PUSCH (switching using DCI/MAC CE) is configured, option 2-1 or option 2-2 below may be employed in PUSCH power control.

As shown in FIG. 3, in 3GPP Rel. 16, a PUSCH power control information element (PUSCH-PowerControl information element) of an RRC parameter includes "twoPUSCH-PC-AdjustmentStates" indicating the number of PUSCH power control adjustment states (1 or 2) and "sri-PUSCH-ClosedLoopIndex" being a parameter indicating an index of a closed-loop power control state.

[Option 2-1]

A UE may use one common (one set of) closed loop for both waveforms (CP-OFDM and DFT-s-OFDM). The UE may count (or accumulate) TPC commands regardless of an indicated waveform.

Note, however, that when a base station (gNB) indicates sri-PUSCH-ClosedLoopIndex=i0 for CP-OFDM, and indicates sri-PUSCH-ClosedLoopIndex=i1 for DFT-s-OFDM, a count of two closed loops may be available depending on implementation of the base station.

[Option 2-2]

The UE may use two separate (two sets of) closed loops for respective waveforms (CP-OFDM and DFT-s-OFDM). The UE may count TPC commands individually for each waveform.

When "twoStates" is configured for "twoPUSCH-PC-AdjustmentStates," sri-PUSCH-ClosedLoopIndex {i0, i1} may be used for the CP-OFDM, and an additional parameter sri-PUSCH-ClosedLoopIndex_2nd {i0, i1} may be used for the DFT-s-OFDM.

When "twoStates" is not configured for "twoPUSCH-PC-AdjustmentStates," sri-PUSCH-ClosedLoopIndex in a current specification may be reused. In other words, in a case where sri-PUSCH-ClosedLoopIndex {i0, i1} is configured, sri-PUSCH-ClosedLoopIndex=i0 may be configured when CP-OFDM is applied, and sri-PUSCH-ClosedLoopIndex=i1 may be configured when DFT-s-OFDM is applied.

When "twoStates" is not configured for "twoPUSCH-PC-AdjustmentStates," sri-PUSCH-ClosedLoopIndex in the current specification may not be reused. In other words, sri-PUSCH-ClosedLoopIndex={i0} and sri-PUSCH-ClosedLoopIndex_2nd={i0} are configured. sri-PUSCH-ClosedLoopIndex=i0 may be used for CP-OFDM, and sri-PUSCH-ClosedLoopIndex_2nd=i0 may be used for DFT-S-OFDM. In this example, i1 may be used in place of i0.

The control in the present embodiment may be employed not only in closed-loop power control but also in open-loop power control. The open-loop power control is performed, based on parameters such as $M^{PUSCH}_{RB,b,f,c}$ (i), $P_{O\_PUSCH,b,f,c}$ (j), $\alpha_{b,f,c}$ (j), and $PL_{b,f,c}$ ($q_d$), as mentioned above. For example, $P_{O\_PUSCH,b,f,c}$ (j) and $\alpha_{b,f,c}$ (j) are based on $P_O$ and $\alpha$ indicated by sri-P0-PUSCH-AlphaSetId shown in FIG. 3, and $PL_{b,f,c}$ ($q_d$) is based on a pathloss indicated by sri-PUSCH-PathlossReferenceRS-Id. $P_O$ and $\alpha$ may be configured with a plurality of values for each PUSCH power configuration (PUSCH-PowerControl). One common (one set of) closed-loop control parameter may be used for both waveforms (CP-OFDM and DFT-s-OFDM), or two separate (two sets of) closed-loop control parameters may be used for both the waveforms.

For a BLER (or a required SNR), comparing DFT-s-OFDM with consecutive PRB assignment and CP-OFDM with non-consecutive PRB assignment, the CP-OFDM has a frequency diversity gain, and thus the CP-OFDM is better. In particular, a small number of PRBs improves diversity. There is a possibility that MIMO is applied to CP-OFDM, and MIMO is not applied to DFT-s-OFDM. Thus, a target SNR varies in some cases. Therefore, a closed loop is configured for each waveform, thereby enabling flexible power control.

According to a second embodiment, even when switching of a waveform is performed, it is possible to configure an appropriate open-loop/closed-loop control parameter.

Third Embodiment

[Aspect 3-1]

A UE may receive DCI to determine (switch) a waveform (DFT-s-OFDM and CP-OFDM) to be used for a PUSCH, based on a modulation and coding scheme (MCS) field of the DCI. In other words, the UE determines a waveform, based on implicit signaling using the DCI.

FIG. 4 is a diagram to show a first example of an MCS table in 3GPP Rel. 16. FIG. 5 is a diagram to show a second example of the MCS table in 3GPP Rel. 16. MCS index corresponds to an MCS field of the DCI. Based on such a table as that shown in FIG. 4 or 5, the UE may use DFT-s-OFDM for the PUSCH when an MCS index, a modulation order, a target code rate, and spectral efficiency are each less/greater than a certain value (X), otherwise (being the certain value or more/less), the UE may use CP-OFDM. The X value may be defined in a specification, may be configured by higher layer signaling or the like, or may be configured depending on reporting of a UE capability.

DFT-s-OFDM is beneficial for a cell edge, and thus it is conceivable that a lower MCS is used in DFT-s-OFDM. When an MCS indicated in DCI for scheduling a PUSCH is less than a specific value, and is a specific modulation order (corresponding to QPSK), DET-s-OFDM may be used for the PUSCH, otherwise, CP-OFDM may be used, depending on RRC configuration.

For example, the UE may use DFT-s-OFDM for the PUSCH when an MCS index/modulation order/target code rate/spectral efficiency correspond to parts surrounded by dotted lines in FIGS. 4 and 5 (when QPSK is used), otherwise, the UE may use CP-OFDM.

In a current specification, different MCS tables are used for CP-OFDM and DFT-s-OFDM. As shown in the examples in FIGS. 4 and 5, the MCS table is a table indicating a relationship between an MCS index/modulation order/target code rate/spectral efficiency.

When dynamic waveform switching is configured, the UE may determine a waveform by using an MCS of the DCI and a specific MCS table. In other words, the UE may determine, in the specific MCS table, a modulation order/target code rate/spectral efficiency corresponding to a value of an MCS index field of the DCI, and may determine the waveform, based on the modulation order/target code rate/spectral efficiency. The specific MCS table to be used may be any one of (1) to (3) below.

(1) MCS table indicated/configured for CP-OFDM (2) MCS table indicated/configured for DFT-s-OFDM (3) Either CP-OFDM MCS table or DFT-s-OFDM MCS table preconfigured by higher layer signaling

[Aspect 3-2]

The UE may determine (switch) a waveform for the PUSCH (DFT-S-OFDM/CP-OFDM), based on resource assignment. For example, the UE may determine the waveform, based on a frequency domain resource assignment field of the DCI.

For example, the UE may determine to use DFT-s-OFDM when the frequency domain resource assignment field corresponds to consecutive PRBs being the product of powers of 2, 3, and 5 ($M_{RB}^{PUSCH}=2^{\alpha 2}\cdot 3^{\alpha 3}\cdot 5^{\alpha 5}$), otherwise, the UE may determine to use CP-OFDM.

[Aspect 3-3]

The UE judges an indicated rank/layer, based on a precoding information and number of layers field of the DCI. The UE may use DFT-s-OFDM for the PUSCH when rank 1 (single layer) is indicated, otherwise (in other words, when multiple layers are indicated), the UE may use CP-OFDM for the PUSCH. In other words, the UE may apply CP-OFDM to the PUSCH when multiple layers are indicated, otherwise, the UE may apply DFT-s-OFDM to the PUSCH. That is, the UE determines, based on the precoding information and number of layers field, a waveform to be used for the PUSCH.

The UE may determine the waveform in consideration of an MCS, in addition to consideration of whether rank 1 is indicated. For example, the UE may apply DFT-s-OFDM to the PUSCH in a case of, for example, rank 1 and MCS<X, otherwise, the UE may apply CP-OFDM to the PUSCH. Alternatively, the UE may determine the waveform without considering the MCS, depending on only whether rank 1 is indicated.

When transmission configuration information (tXConfig) is configured in PUSCH configuration (PUSCH-Config) (in other words, UL MIMO is configured), the UE may select DFT-s-OFDM or CP-OFDM, based on a rank/the number of layers indicated in a DCI field (and a corresponding table). The DCI field may be a precoding information and number of layers field in a case of codebook MIMO, and may be an SRI field in a case of non-codebook MIMO.

In a specification, different precoding information and number of layers tables are specified for CP-OFDM and DFT-s-OFDM. In the present aspect, the UE first selects one table (table for CP-OFDM or DFT-s-OFDM), and then selects DFT-s-OFDM or CP-OFDM depending on the number of layers.

When dynamic waveform switching is configured, the precoding information and number of layers field may be determined based on assumption for CP-OFDM.

For example, RRC signaling may configure, for the UE, use of DFT-s-OFDM in a case of configured rank 1 and use of CP-OFDM in a case of configured rank 2. Even in this case, waveform indication may be performed by assuming CP-OFDM (by using a precoding information and number of layers table in a case where a transform precoder is disabled).

FIG. 6 is a diagram to show the precoding information and number of layers table in 3GPP Rel. 16 in a case where the transform precoder is disabled. In the table in FIG. 6, when the precoding information and number of layers field of the DCI indicates parts shown in areas with dotted lines (indicates 1 layer), the UE applies DFT-s-OFDM, and when the field indicates parts other than those parts, the UE applies CP-OFDM.

FIG. 7 is a diagram to show the precoding information and number of layers table in 3GPP Rel. 16 in a case where the transform precoder is enabled. In the table in FIG. 7, the table corresponds to 1 layer in all cases, and thus the UE applies DFT-s-OFDM depending on indication by the DCI.

[[Variation 1]]

When availability of dynamic waveform (CP-OFDM/DFT-S-OFDM) switching is configured by higher layer signaling, a new precoding information and number of layers table may be employed. When the dynamic waveform switching is configured, a bit size of the precoding information and number of layers field may be x bits.

FIG. 8 is a diagram to show the precoding information and number of layers table in a case where the dynamic waveform switching is configured. FIG. 8 shows a table obtained by adding a new field (columns) to the example in FIG. 6. In this new field, waveform (CP-OFDM/DFT-s-OFDM) indication may be configured/defined. The waveform indication may be configured for each index, or may be configured for each plurality of indices. The waveform indication may be information indicating enabling/disabling of the transform precoder.

Such a new table as that shown in FIG. 8 may be defined separately from such an existing table as that shown in FIG. 6. The UE may use the new table when the dynamic waveform switching is configured by the higher layer signaling, otherwise, the UE may use the existing table.

Such a new table as that shown in FIG. 8 may be a table obtained by performing update for adding a new field to such an existing table as that shown in FIG. 6. When the dynamic waveform switching is configured by the higher layer signaling, the UE determines a waveform by referring to the waveform indication in the new field. When the dynamic waveform switching is not configured, the UE may judge that the transform precoder is disabled (CP-OFDM).

[[Variation 2]]

The UE may use DFT-s-OFDM for the PUSCH when rank 1 (single layer) or a single antenna port is indicated, otherwise, the UE may use CP-OFDM.

When transmission configuration information (tXConfig) is configured in PUSCH configuration (PUSCH-Config) (in other words, UL MIMO is configured), the UE may select DFT-s-OFDM or CP-OFDM, based on a rank/the number of layers indicated in a DCI field (and a corresponding table). The DCI field may be a precoding information and number of layers field in a case of codebook MIMO, and may be an SRI field in a case of non-codebook MIMO.

When transmission configuration information (tXConfig) is not configured in PUSCH configuration (PUSCH-Config) (in other words, UL MIMO is not configured), the UE may use DFT-s-OFDM.

[Aspect 3-4]

The UE may judge, based on an antenna port field of the DCI, whether the PUSCH and a demodulation reference signal (DMRS) are frequency division multiplexed (FDMed) with each other. When the PUSCH and the DMRS are FDMed with each other, the UE may use a CP-OFDM waveform for the PUSCH, and when the PUSCH and the DMRS are not FDMed with each other, the UE may use a DFT-s-OFDM waveform for the PUSCH. In other words, the UE may determine, based on the antenna port field of the DCI, a waveform to be used for the PUSCH.

The UE can determine whether the PUSCH and the DMRS are FDMed with each other, based on "number of DMRS CDM group (s) without data" in a table corresponding to the antenna port field of the DCI. The UE judges that the PUSCH and the DMRS are FDMed with each other and determines to use CP-OFDM when "number of DMRS CDM group (s) without data" corresponding to the antenna port field is 1, otherwise, the UE judges that the PUSCH and the DMRS are not FDMed with each other and determines to use DFT-s-OFDM.

FIG. 9 shows the table corresponding to the antenna port field in a case where the transform precoder is disabled in Rel. 16. When the antenna port field (Value) is 0 or 1, "number of DMRS CDM group (s) without data" is 1, and thus the UE judges that the PUSCH and the DMRS are FDMed with each other and determines to use CP-OFDM. On the other hand, when the antenna port field (Value) is anything other than 0 or 1, the UE determines to use DFT-s-OFDM.

FIG. 10 shows the table corresponding to the antenna port field in a case where the transform precoder is enabled in 3GPP Rel. 16. In an example in FIG. 10, "number of DMRS CDM group (s) without data" is all 2 (not 1), and thus the UE judges that the PUSCH and the DMRS are not FDMed with each other and determines to use DFT-s-OFDM, regardless of a value of the antenna port field. In other words, in an existing specification, FDM between the PUSCH and the DMRS is allowed for only CP-OFDM.

Note that the UE may first select one table (for example, a table corresponding to CP-OFDM), and may then select DFT-s-OFDM or CP-OFDM depending on "number of DMRS CDM group (s) without data." When the dynamic waveform switching is configured, the UE may determine the antenna port field ("number of DMRS CDM group (s) without data"), based on assumption for CP-OFDM.

In Rel. 15/16, "number of DMRS CDM group (s) without data" dynamically indicates whether the PUSCH and the DMRS are FDMed with each other. When DFT-s-OFDM is used, the PUSCH and the DMRS are not always FDMed with each other.

Figure 11:
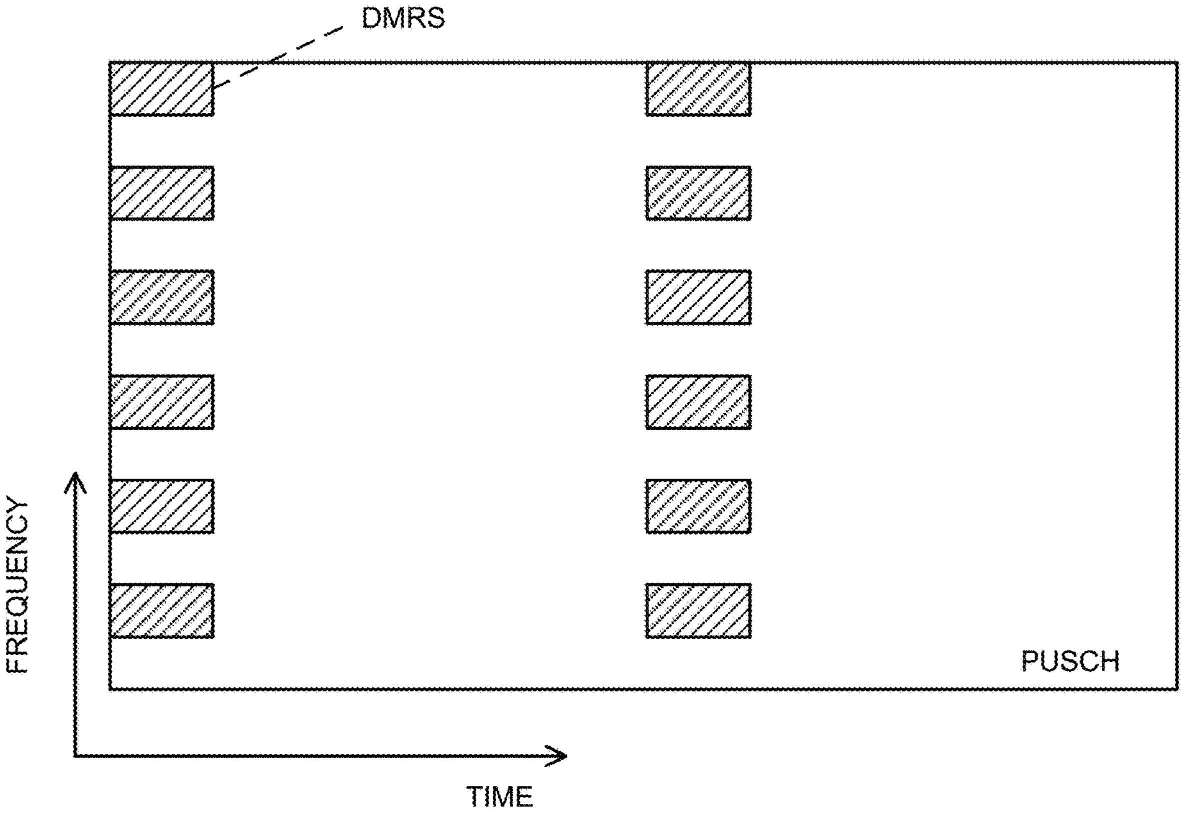
FIG. 11 is a diagram to show a PUSCH resource configuration in a case where a PUSCH and a DMRS are FDMed with each other.

FIG. 11 is a diagram to show a PUSCH resource configuration in a case where the PUSCH and the DMRS are FDMed with each other. For example, FIG. 11 is employed in a case where "number of DMRS CDM group (s) without data" is 1 in DMRS type 1. In FIG. 11, the PUSCH is arranged on a resource between a plurality of DMRSs in a frequency direction. In other words, the PUSCH and the DMRS are FDMed with each other. In this case, the UE uses CP-OFDM.

Figure 12:
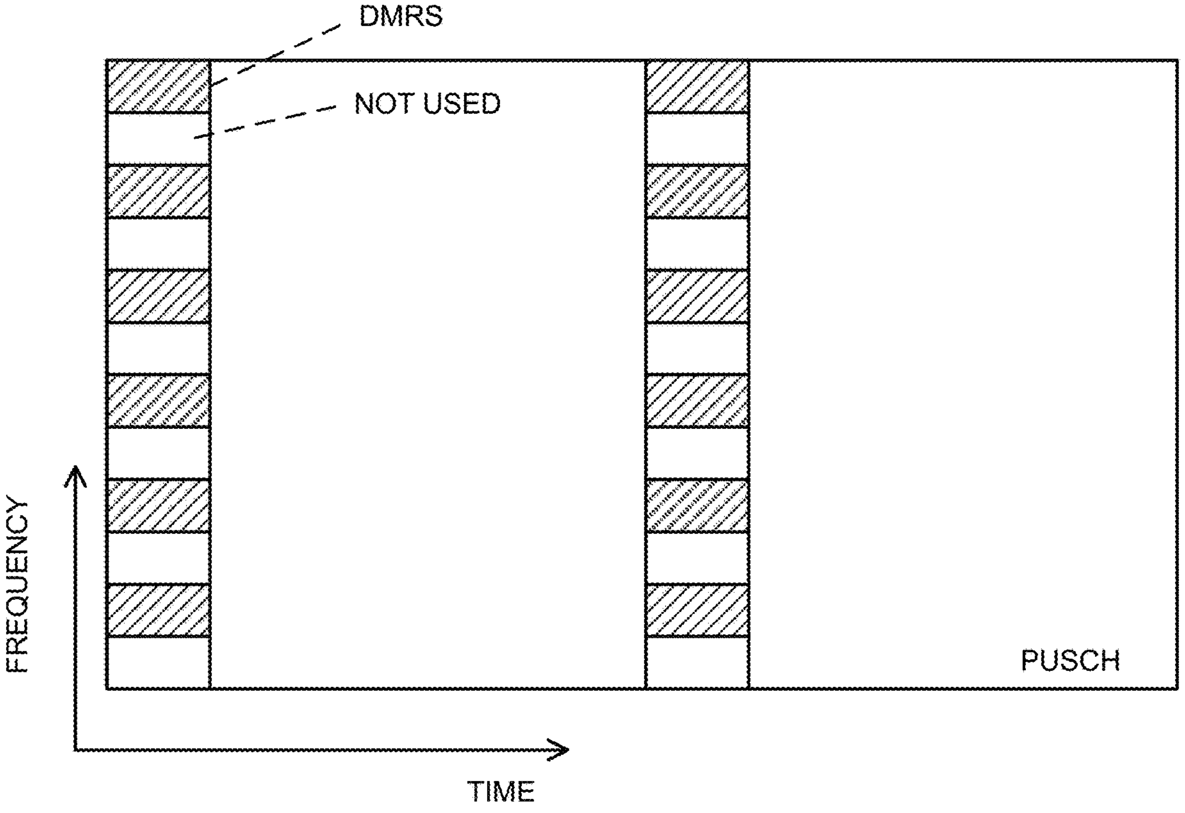
FIG. 12 is a diagram to show a PUSCH resource configuration in a case where a PUSCH and a DMRS are not FDMed with each other.

FIG. 12 is a diagram to show a PUSCH resource configuration in a case where the PUSCH and the DMRS are not FDMed with each other. For example, FIG. 12 is employed in a case where "number of DMRS CDM group (s) without data" is 2 in DMRS type 1. In FIG. 12, a signal/channel is not arranged (used) on a resource between a plurality of DMRSs in a frequency direction. In other words, the PUSCH and the DMRS are not FDMed with each other. In this case, the UE uses DFT-s-OFDM.

According to a third embodiment, the UE can determine a waveform, based on an existing DCI field, and thus an increase in a DCI size can be suppressed.

Fourth Embodiment

When waveform switching using DCI/MAC CE is configured (regardless of whether the switching is implicit/explicit), a waveform switching delay may be introduced. A UE uses/determines (is configured with), as a minimum value of K2 (period from DCI reception until PUSCH transmission) for dynamic waveform switching, a second period longer than a first period in a case where the dynamic waveform switching is not performed. When receiving, by using the DCI/MAC CE, an indication indicating disabling or enabling of a transform precoder for a PUSCH, the UE may apply the second period as a period from reception of the DCI until transmission of the PUSCH.

When dynamic waveform switching is configured (by, for example, higher layer signaling), a K2 value may correspond to at least one of a definition in a specification, configuration by higher layer signaling, and a reported UE capability. In this case, the K2 value longer than an existing value may be applied regardless of whether dynamic waveform switching is indicated by the DCI/MAC CE.

When the DCI/MAC CE indicates waveform switching for the PUSCH, a K2 value may correspond to at least one of a definition in a specification, configuration by higher layer signaling, and a reported UE capability. The K2 value longer than an existing value may be applied only when dynamic waveform switching is indicated by the DCI/MAC CE.

The configured minimum value of K2 may be an additional value of an existing minimum value of K2 or an absolute value of K2. The minimum value of K2 may vary depending on subcarrier spacing (Sub-Carrier Spacing, SCS), or may be constant.

Figures 13A, 13B:
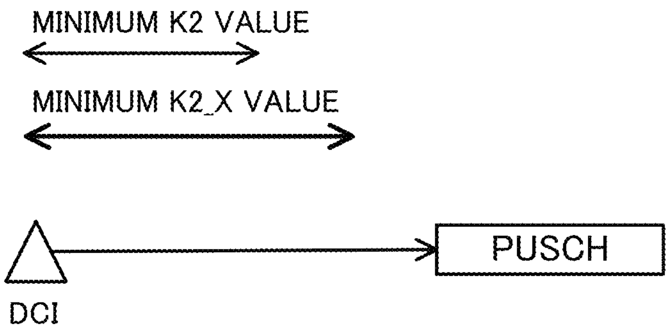
FIG. 13A is a diagram to show an example of configuration of a minimum value of K2 for each SCS.
FIG. 13B is a diagram to show an example of an existing minimum K2 value and a new minimum K2_X value.

FIG. 13A is a diagram to show an example of configuration of the minimum value of K2 for each SCS. K2_X in FIG. 13A is a value with consideration of dynamic waveform switching, and corresponds to SCS (kHz). FIG. 13B is a diagram to show an example of an existing minimum K2 value and a new minimum K2_X value. The new minimum K2_X value considers dynamic waveform switching, and thus is greater than the existing minimum K2 value.

[PUSCH Scheduling by Base Station]

When the PUSCH is scheduled by a base station (gNB), the UE receives DCI including time domain resource assignment (Time Domain Resource Assignment or allocation (TDRA)) corresponding to a minimum K2 value. The UE receives, by using higher layer signaling/MAC CE/DCI, a value with consideration of dynamic waveform switching, the value being added to the TDRA (referred to hereinafter as an additional value). The UE uses, as a delay period with consideration of dynamic waveform switching (period from reception of the DCI until transmission of the PUSCH), a value obtained by adding the additional value to the TDRA.

When a plurality of minimum K2 values are specified, there is a possibility that applying a TDRA table directly is unsuitable. This is because there is a possibility that some TDRA values are less than the K2 value with consideration of dynamic waveform switching. Thus, when dynamic waveform switching is configured (or only when a DCI format indicates waveform switching for the PUSCH), an additional value of a symbol/slot may be added to a time-domain resource indicated by the TDRA. When an additional value for the dynamic waveform switching is configured by RRC, and K2 and the additional value are less than a certain value, the additional value may be disabled.

For example, a new RRC parameter (for example, dynamicWaveformSwitching) may be configured, and the additional value may be configured by the parameter. In an existing UE (for example, Rel. 15/16), the new RRC parameter is not indicated, and dynamic waveform switching is not performed, and thus the additional value may not be added.

In a case where dynamic waveform switching is configured, and the UE is with a K2 value by an RRC parameter "minimumSchedulingOffsetK2," when the UE does not receive a Minimum applicable scheduling offset indicator field of DCI format 0_1 or DCI format 1_1, the UE may apply limitation to minimum scheduling offset of the additional value (or a default value). Note that in an existing system, the UE regards the additional value as 0.

The additional value (X symbols/slots) of K2 may be constant or may vary, depending on SCS. A fixed value for each SCS may be defined for the additional value, or the additional value may be defined in a specification, or may be configured by higher layer signaling. When the additional value is absent, the UE may use, as the additional value, 0 or a certain value (default value).

The additional value may be configured for each SCS when being included in an information element (for example, "MAC-CellGroupConfig") not depending on BWP configuration. When the additional value is included in an information element (for example, "PUSCH-Config") depending on BWP configuration, SCS is determined depending on the information element, and thus the additional value may not be configured for each SCS. A unit of the additional value may be a subframe, and in this case, it is unnecessary that the additional value is configured for each SCS.

Figures 14A, 14B:
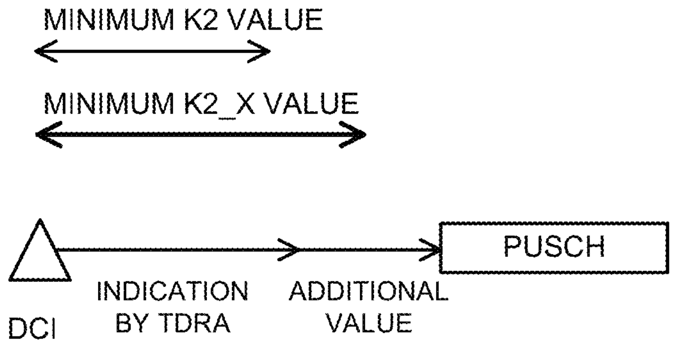
FIG. 14A is a diagram to show an example of configuration of an additional value of K2 for each SCS.
FIG. 14B is a diagram to show an example of an additional value for TDRA.

FIG. 14A is a diagram to show an example of configuration of the additional value of K2 for each SCS. The additional value in FIG. 14A is an additional value of K2 with consideration of dynamic waveform switching. FIG. 14B is a diagram to show an example of the additional value for the TDRA. As shown in FIG. 14B, a period obtained by adding the additional value to a value indicated by the TDRA may be applied to a period from DCI reception until PUSCH transmission.

[[Addition to TimeDomainAllocationList]]

FIG. 15 is a diagram to show an example of TimeDomainAllocationList including the additional value. As shown in FIG. 15, additional values are newly included in TimeDomainAllocationList, thereby allowing an additional value to be configured for individual K2.

When dynamic waveform switching is configured (or only when the DCI format indicates waveform switching for the PUSCH), in a case of a scheduled PUSCH with K2 (indicated by the TDRA)+additional value (if configured) less than a minimum value of K2 in indication of the dynamic waveform switching, the UE may not transmit (may drop) the PUSCH. Note that there is a case where due to failure to transmit the DCI, it is unclear whether the DCI format indicates waveform switching for the PUSCH (discrepancy between recognitions by the base station and the UE). Thus, the UE may perform the above process when the dynamic waveform switching is configured (regardless of the presence or absence of waveform switching using the DCI).

<Others>

When dynamic waveform switching for a PUSCH is performed by using MAC CE signaling, the UE may, after receiving an indication by a MAC CE, switch a waveform after certain time (for example, 3 ms) from ACK transmission for a PDSCH including the MAC CE. The UE may, after receiving a waveform switching indication by using the MAC CE, transmit reception completion notification to the base station (by using, for example, a certain physical channel or a MAC CE). Therefore, it is possible to avoid discrepancy between waveform recognitions by the base station and the UE due to failure to transmit the MAC CE.

<UE Capability>

The UE may transmit (report), to a network (base station), UE capability information indicating whether to support at least one of respective processes in the present disclosure. At least one of the above-mentioned embodiments may be employed in only a UE that has reported a specific UE capability or that supports the specific UE capability.

The specific UE capability may indicate at least one of the following:

(1) Whether to support dynamic waveform switching (enabling/disabling of transform precoder)

(2) Whether DCI/MAC CE can switch waveform (transform precoder)

(3) DCI format supported by UE (4) Whether UE supports two separate (two sets of) CL loops for each waveform The UE may receive, by using DCI/MAC CE/higher layer signaling (for example, RRC) or the like, information for indicating/configuring at least one of the respective processes in the present disclosure, and may, when receiving the information, perform the process in the present disclosure. The information may correspond to UE capability information transmitted by the UE. One piece of the information (for example, an RRC parameter) may be configured for all DCI formats, or may be configured for each DCI format.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 16:
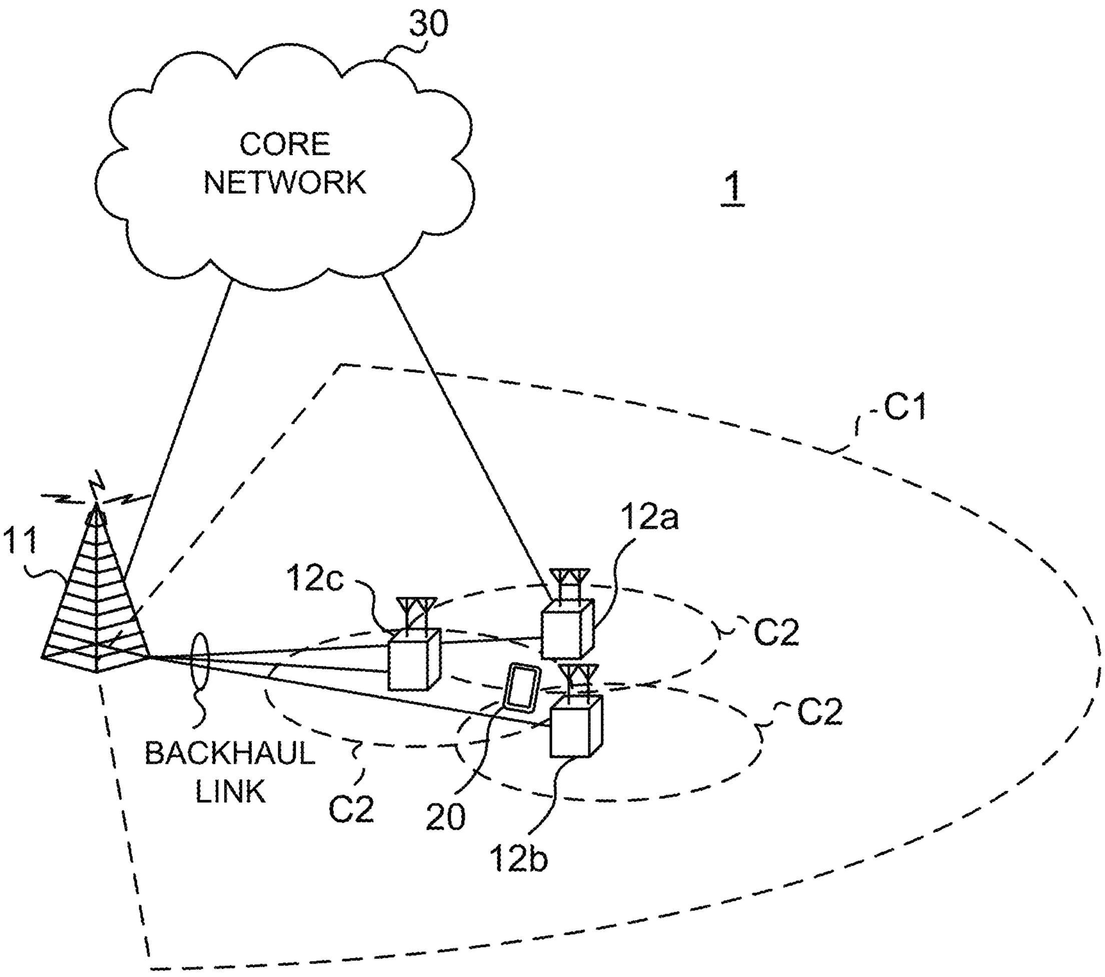
FIG. 16 is a diagram to show an example of a schematic structure of a radio communication system according to one embodiment.

FIG. 16 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12_a_ to 12_c_) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHZ), and FR2 may be a frequency band which is higher than 24 GHZ (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 17:
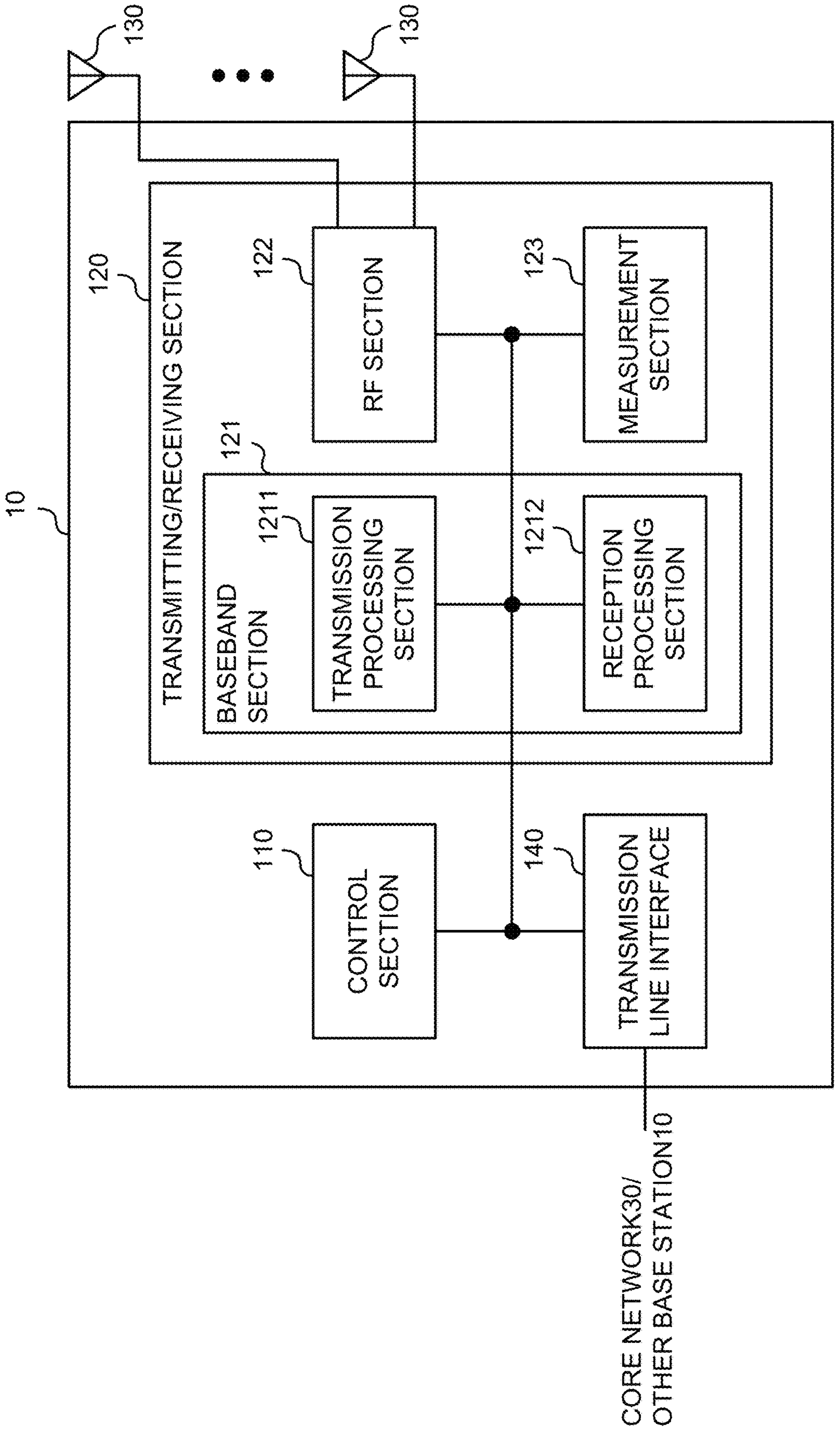
FIG. 17 is a diagram to show an example of a structure of a base station according to one embodiment.

FIG. 17 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit, by using at least one of downlink control information (DCI) and a Medium Access Control Control Element (MAC CE), an indication indicating disabling or enabling of a transform precoder for a physical downlink shared channel (PUSCH). The control section 110 may assume that a waveform to be used for the PUSCH is switched based on the indication.

When switching, by at least one of the DCI and the MAC CE, of the transform precoder for the PUSCH is configured, a size of each DCI format may be a larger one of a size of a DCI format in a case where the transform precoder is disabled and a size of a DCI format in a case where the transform precoder is enabled.

When switching, by at least one of the DCI and the MAC CE, of the transform precoder for the PUSCH is configured, a larger size of a size of a DCI field in a case where the transform precoder is disabled and a size of the DCI field in a case where the transform precoder is enabled may be determined for each DCI field, and a total DCI format size may be a sum value of the larger sizes in all DCI fields.

When switching, by at least one of the DCI and the MAC CE, of the transform precoder for the PUSCH is configured, two separate closed loops may be configured for each waveform.

The transmitting/receiving section 120 may transmit downlink control information (DCI). The control section 110 may assume that a waveform to be used for a physical downlink shared channel (PUSCH) is determined based on at least one of a modulation and coding scheme (MCS) field, a frequency domain resource assignment field, a precoding information and number of layers field, and an antenna port field of the DCI.

The transmitting/receiving section 120 may transmit a configuration indicating that disabling or enabling of a transform precoder for a physical downlink shared channel (PUSCH) is dynamically switched by at least one of downlink control information (DCI) and a Medium Access Control Control Element (MAC CE). The control section 110 may assume that as a period from reception of the DCI until transmission of the PUSCH, a second period longer than a first period in a case where the waveform is not switched is used.

(User Terminal)

Figure 18:
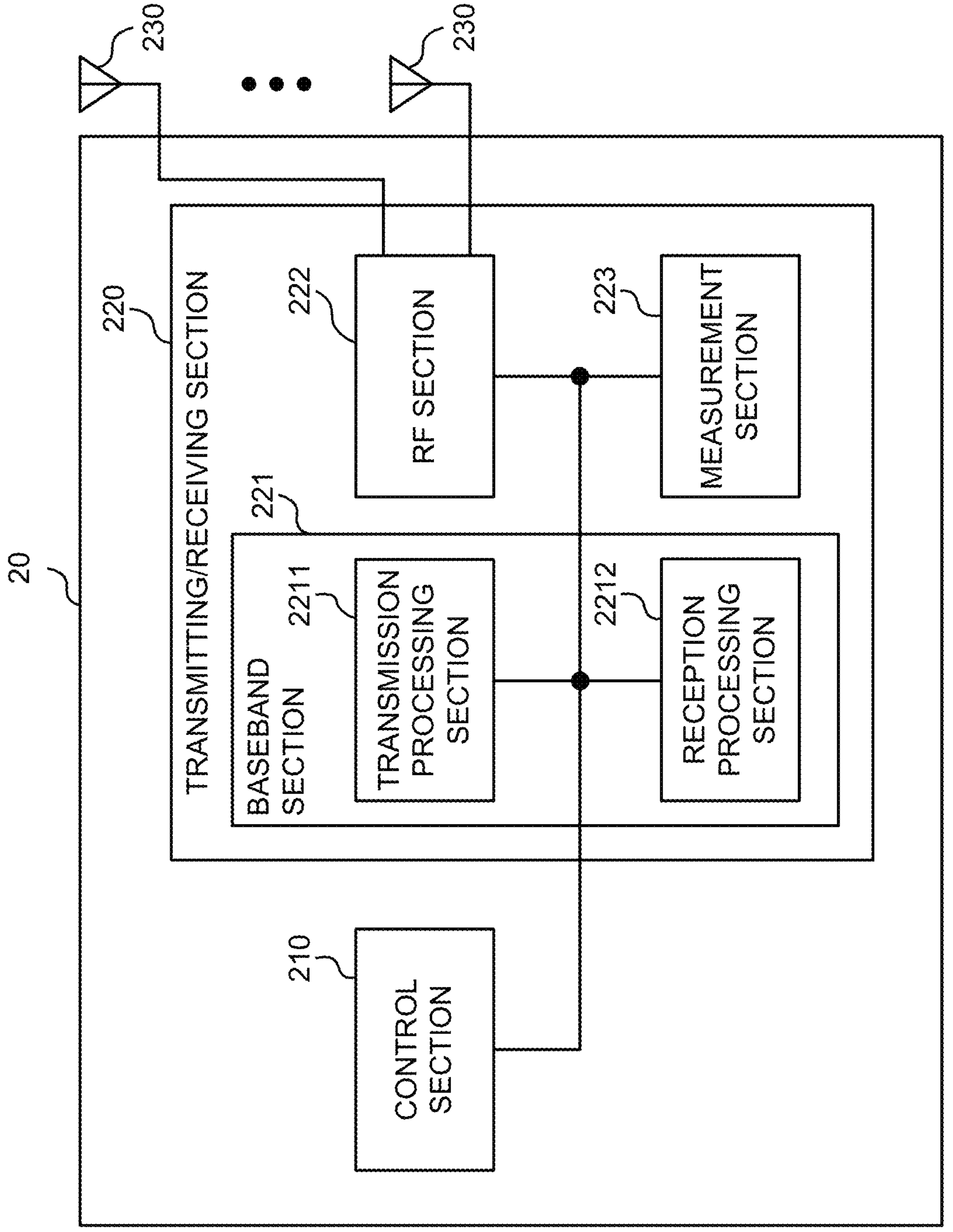
FIG. 18 is a diagram to show an example of a structure of a user terminal according to one embodiment.

FIG. 18 is a diagram to show an example of a structure of the user terminal according to one embodiment. The user terminal 20 includes a control section 210, a transmitting/ receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 may receive, by using at least one of downlink control information (DCI) and a Medium Access Control Control Element (MAC CE), an indication indicating disabling or enabling of a transform precoder for a physical downlink shared channel (PUSCH). The control section 210 may switch, based on the indication, a waveform to be used for the PUSCH.

When switching, by at least one of the DCI and the MAC CE, of the transform precoder for the PUSCH is configured, a size of each DCI format may be a larger one of a size of a DCI format in a case where the transform precoder is disabled and a size of a DCI format in a case where the transform precoder is enabled.

When switching, by at least one of the DCI and the MAC CE, of the transform precoder for the PUSCH is configured, a larger size of a size of a DCI field in a case where the transform precoder is disabled and a size of the DCI field in a case where the transform precoder is enabled may be determined for each DCI field, and a total DCI format size may be a sum value of the larger sizes in all DCI fields.

When switching, by at least one of the DCI and the MAC CE, of the transform precoder for the PUSCH is configured, two separate closed loops may be configured for each waveform.

The transmitting/receiving section 220 may receive downlink control information (DCI). The control section 210 may determine a waveform to be used for a physical downlink shared channel (PUSCH), based on at least one of a modulation and coding scheme (MCS) field, a frequency domain resource assignment field, a precoding information and number of layers field, and an antenna port field of the DCI.

The control section 210 may use, for the PUSCH, a Discrete Fourier Transform-Spread-Orthogonal Frequency Division Multiplexing (DFT-s-OFDM) waveform when the MCS field is less than a certain value, and may use a Cyclic Prefix-Orthogonal Frequency Division Multiplexing (CP-OFDM) waveform when the MCS field is greater than or equal to the certain value.

The control section 210 may judge, based on the precoding information and number of layers field, an indicated layer, may use a DFT-s-OFDM waveform for the PUSCH when a single layer is indicated, and may use a CP-OFDM waveform when multiple layers are indicated.

The control section 210 may judge, based on the antenna port field, whether the PUSCH and a demodulation reference signal (DMRS) are frequency division multiplexed (FDMed) with each other, may use a CP-OFDM waveform for the PUSCH when the PUSCH and the DMRS are FDMed with each other, and may use a DFT-s-OFDM waveform for the PUSCH when the PUSCH and the DMRS are not FDMed with each other.

The transmitting/receiving section 220 may receive a configuration indicating that disabling or enabling of a transform precoder for a physical downlink shared channel (PUSCH) is dynamically switched by at least one of downlink control information (DCI) and a Medium Access Control Control Element (MAC CE). The control section 210 may use, as a period from reception of the DCI until transmission of the PUSCH, a second period longer than a first period in a case where the waveform is not switched.

The transmitting/receiving section 220 may receive, by using at least one of the DCI and the MAC CE, an indication indicating disabling or enabling of the transform precoder for the PUSCH. The control section 210 may, when receiving the indication, use the second period as a period from reception of the DCI until transmission of the PUSCH.

The transmitting/receiving section 220 may receive DCI including time domain resource assignment (TDRA), and may receive a value to be added to the TDRA. The control section 210 may use, as the second period, a value obtained by adding the value to the TDRA. The second period may vary depending on subcarrier spacing (SCS).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 19:
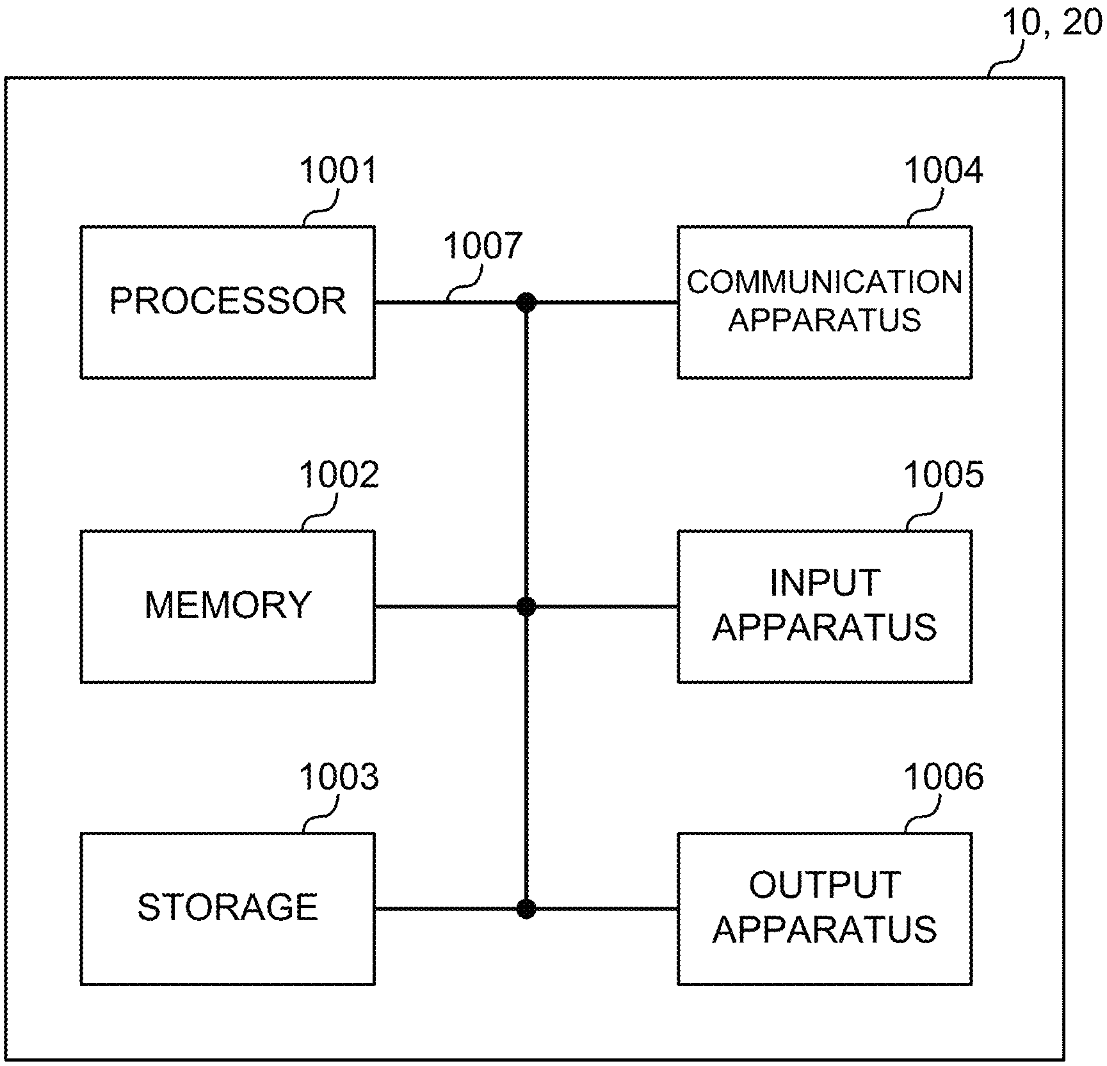
FIG. 19 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 19 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a “normal TTI” (TTI in 3GPP Rel. 8 to Rel. 12), a “long TTI,” a “normal subframe,” a “long subframe,” a “slot” and so on. A TTI that is shorter than a normal TTI may be referred to as a “shortened TTI,” a “short TTI,” a “partial or fractional TTI,” a “shortened subframe,” a “short subframe,” a “mini-slot,” a “sub-slot,” a “slot” and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a “physical resource block (Physical RB (PRB)),” a “sub-carrier group (SCG),” a “resource element group (REG),” a “PRB pair,” an “RB pair” and so on.

Furthermore, a resource block may be constituted of one or a plurality of resource elements (REs). For example, one RE may correspond to a radio resource field of one subcarrier and one symbol.

A bandwidth part (BWP) (which may be referred to as a “fractional bandwidth,” and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a “cell,” a “carrier,” and so on in the present disclosure may be interpreted as a “BWP”.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as “Layer 1/Layer 2 (L1/L2) control information (L1/L2 control signals),” “L1 control information (L1 control signal),” and so on. Also, RRC signaling may be referred to as an “RRC message,” and can be, for example, an RRC connection setup message, an RRC connection reconfiguration message, and so on. Also, MAC signaling may be reported using, for example, MAC control elements (MAC CEs).

Also, reporting of certain information (for example, reporting of “X holds”) does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as “software,” “firmware,” “middleware,” “microcode,” or “hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "sidelink"). For example, an uplink channel, a downlink channel and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:

a receiver that receives, from downlink control information (DCI), indication indicating whether a transform precoder is disabled or enabled for a physical uplink shared channel (PUSCH); and a processor that determines, based on the indication, whether the transform precoder is disabled or enabled for the PUSCH, wherein a size of each field in the DCI is a larger one of a size of a field in a case where the transform precoder is disabled and a size of a field in a case where the transform precoder is enabled.

2. A radio communication method for a terminal, comprising:

receiving, from downlink control information (DCI), indication indicating whether a transform precoder is disabled or enabled for a physical uplink shared channel (PUSCH); and determining, based on the indication, whether the transform precoder is disabled or enabled for the PUSCH, wherein a size of each field in the DCI is a larger one of a size of a field in a case where the transform precoder is disabled and a size of a field in a case where the transform precoder is enabled.

3. A base station comprising:

a transmitter that transmits, by downlink control information (DCI), indication indicating whether a transform precoder is disabled or enabled for a physical uplink shared channel (PUSCH); and a processor that determines, based on the indication, whether the transform precoder is disabled or enabled for the PUSCH, wherein a size of each field in the DCI is a larger one of a size of a field in a case where the transform precoder is disabled and a size of a field in a case where the transform precoder is enabled.

4. A system comprising a terminal and a base station, wherein:

the terminal comprises:

a receiver that receives, from downlink control information (DCI), indication indicating whether a transform precoder is disabled or enabled for a physical uplink shared channel (PUSCH); and a processor that determines, based on the indication, whether the transform precoder is disabled or enabled for the PUSCH, and the base station comprises:

a transmitter that transmits the DCI, wherein a size of each field in the DCI is a larger one of a size of a field in a case where the transform precoder is disabled and a size of a field in a case where the transform precoder is enabled.

* * * * *